United States Patent [19]

Glenn

[11] Patent Number: 4,855,544
[45] Date of Patent: Aug. 8, 1989

[54] MULTIPLE LEVEL MINIATURE ELECTROMECHANICAL ACCELEROMETER SWITCH

[75] Inventor: Max C. Glenn, James City, Va.

[73] Assignee: Honeywell Inc., Minneapolis, Minn.

[21] Appl. No.: 239,482

[22] Filed: Sep. 1, 1988

[51] Int. Cl.$^4$ ............................................. H01H 35/14
[52] U.S. Cl. ......................... 200/61.45 R; 200/61.48; 200/61.51
[58] Field of Search ............... 200/61.45 R, 61.48, 200/61.49, 61.51, 61.52, 61.53, 266, 267, 268, 269, 181; 307/118, 121; 310/329-332; 357/40, 58, 7, 15

[56] References Cited

U.S. PATENT DOCUMENTS

| | | | |
|---|---|---|---|
| 3,389,236 | 6/1968 | Guthart | 200/61.48 |
| 3,764,820 | 10/1973 | White et al. | 307/121 |
| 4,138,604 | 2/1979 | Harmser et al. | 200/268 |
| 4,356,730 | 11/1982 | Cade | 73/517 R |
| 4,543,457 | 9/1985 | Petersen et al. | 200/83 N |
| 4,673,777 | 6/1987 | Bai et al. | 200/61.45 R |
| 4,737,660 | 4/1988 | Allen et al. | 200/61.45 R X |

OTHER PUBLICATIONS

K. E. Petersen, "Micromechanical Membrane Switches on Silicon," pp. 376-385, *IBM J. Res. Develop*, vol. 23, No. 4 (Jul. 1979).

L. M. Roylance and J. B. Angell, "A Batch-Fabricated Silicon Accelerometer," pp. 1911-1917, *IEEE Transactions on Electron Devices*, vol. Ed-26, No. 12 (Dec. 1979).

L. Holland, et al; "Bottom Contact Micromechanical Switching Geometry"; IBM Technical Disclosure Bulletin; vol. 21, No. 3, Aug. 1978, pp. 1207, 1208.

*Primary Examiner*—J. R. Scott
*Attorney, Agent, or Firm*—W. T. Udseth

[57] ABSTRACT

An accelerometer switch which has cantilever beams carrying integral end masses formed in a silicon die which is sandwiched between a contact plate and a support plate. Each beam provides switching at a different threshold acceleration level. The fixed contact face of the contact plate is configured with a relief space to permit accelerometer switch operation even though the input acceleration is off-normal and there is twisting of the accelerometer beam.

4 Claims, 1 Drawing Sheet

U.S. Patent  Aug. 8, 1989  4,855,544
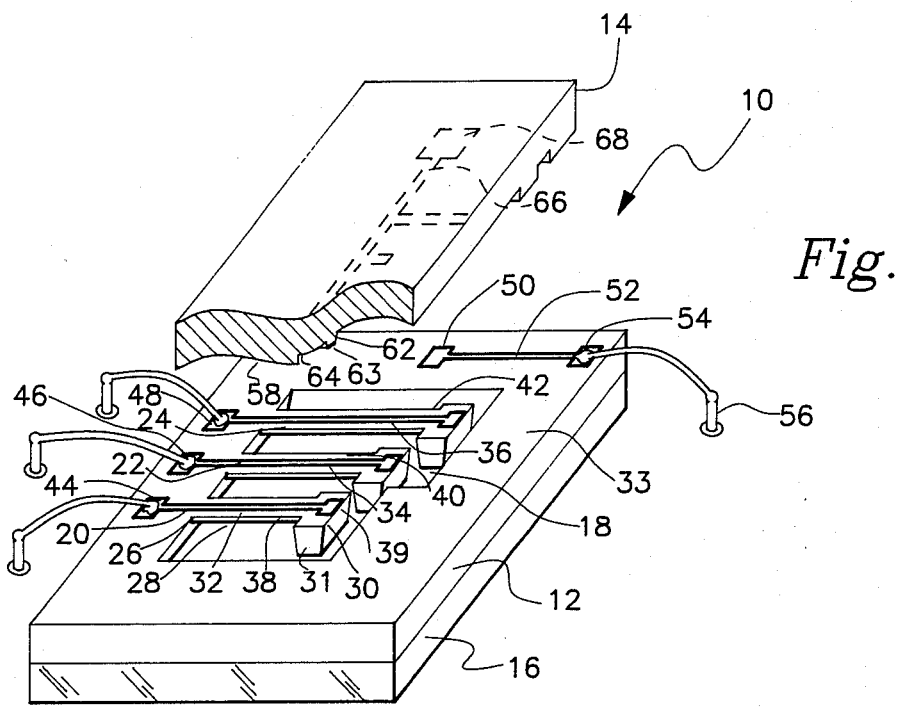
Fig. 1
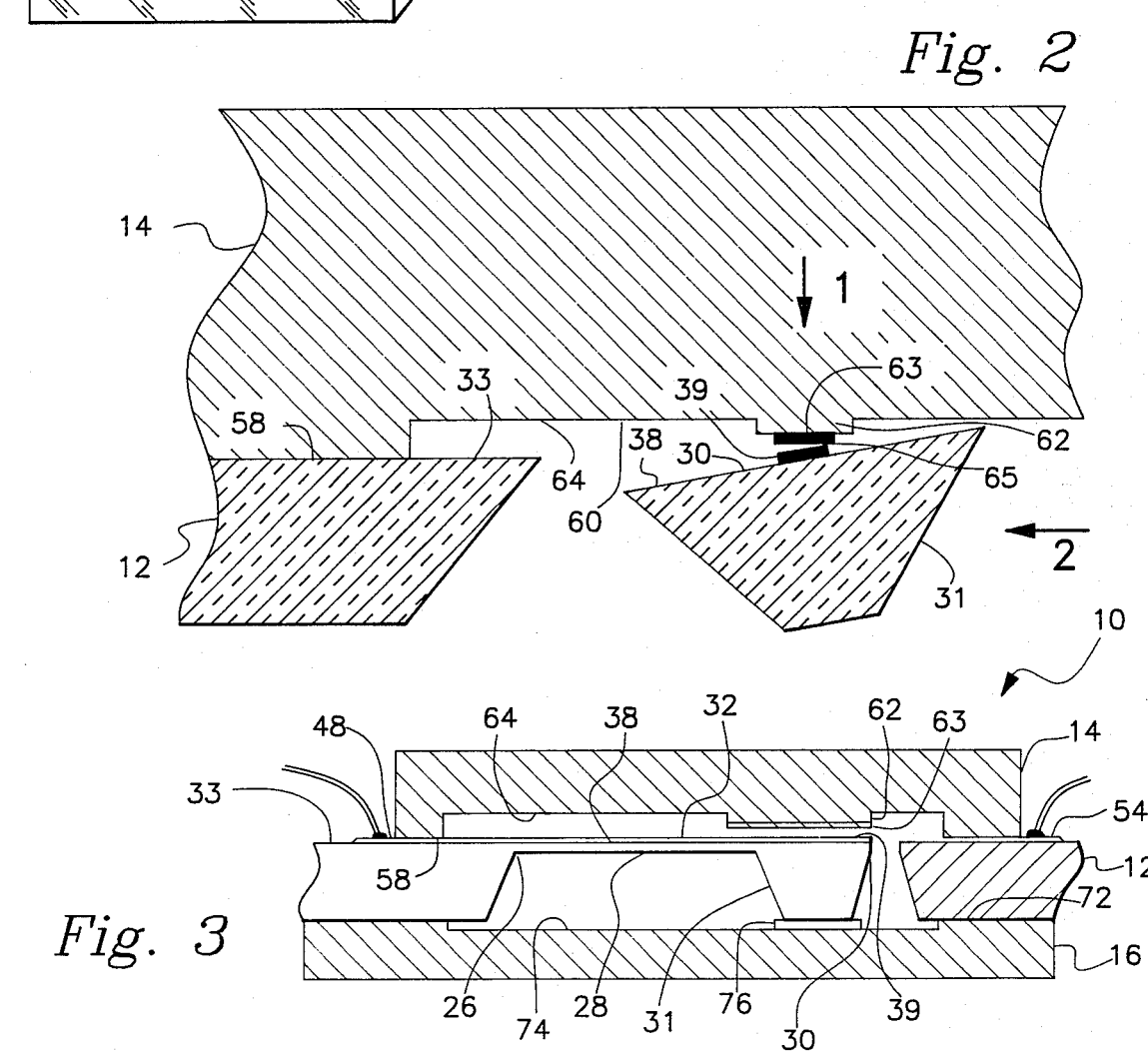
Fig. 2
Fig. 3
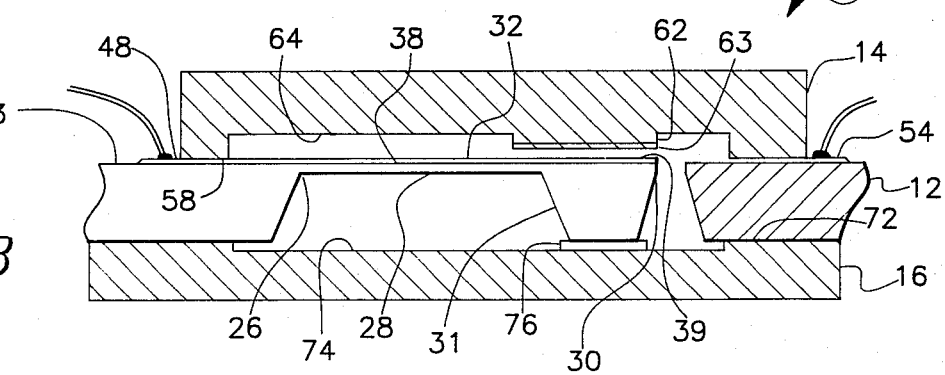

MULTIPLE LEVEL MINIATURE ELECTROMECHANICAL ACCELEROMETER SWITCH

BACKGROUND OF THE INVENTION

The present invention relates generally to the field of devices that are responsive to acceleration, particularly to devices which provide switching action in response to multiple threshold levels of acceleration and specifically to miniature mechanical switching devices fabricated from silicon.

As performance requirements have advanced there has been an increased demand for acceleration switches which are smaller in size and lower in cost but offer improved accuracy and reliability. Micromechanical devices of silicon can be batch-fabricated using silicon technology and as such can be made to high accuracy and high reliability at relatively low cost.

SUMMARY OF THE INVENTION

The present invention utilizes multiple cantilever beams integral to an accelerometer die which is sandwiched between a recessed glass contact plate having fixed contacts and a glass support plate. Each cantilever beam carries an integral silicon end mass and a movable contact. Deflection of a cantilever beam due to acceleration causes the switch contacts to close. The threshold acceleration levels at which the contacts close is determined by the contact gap distance, beam length, beam width, beam thickness, and end mass value. Thus, application specific acceleration switches may be designed to offer the needed acceleration switching levels and to fit into standard packaging configurations. The present invention utilizes a contact arrangement which permits operation even when an off-normal input acceleration causes some rotation of the end mass and twisting of the beam. Further, mechanical biasing is provided which reduces the sensitivity of the accelerometer to noise and increases its resistance to mechanical shock.

BRIEF DESCRIPTION OF THE DRAWINGS

The invention may be best understood from a reading of the following detailed description with the drawings in which:

FIG. 1 is a perspective partially cross-sectioned view of an accelerometer switch in accordance with the principles of the invention;

FIG. 2 is an enlarged fragmentary cross-sectional view of an accelerometer switch in accordance with the principles of the invention; and FIG. 3 is a cross-sectional view of an accelerometer switch in accordance with the principles of the invention.

DESCRIPTION OF THE PREFERRED EMBODIMENT

FIG. 1 illustrates a partially cross-sectioned pictorial view of an embodiment of the invention in which reference numeral 10 generally identifies a microminiature accelerometer switch. The accelerometer switch includes an accelerometer die 12, a contact plate 14, and a backplate 16, each of which may be fabricated by using the batch-fabrication techniques used in microelectronics. The use of such techniques to make miniature mechanical devices is well known and described in various publications, for example "Silicon Micromechanical Devices," *Scientific American,* pp. 44–55, April 1983.

In device 10, die 12 is planar and in the shape of a frame surrounding an opening or void 18. Accelerometer beams 20, 22, and 24 extend into void 18. The general structure of the accelerometer beams is similar, and accelerometer beam 20 will be described as typical. Accelerometer beam 20 is of the cantilever type having a fixed end 26, an intermediate section 28, and a free end 30. An integral end mass 31 is carried by free end 30.

The starting material for silicon die 12 may be a boron-doped silicon wafer with an epitaxially grown layer of phosphorous doped silicon. This layer will be the thickness of beam 20 after the processing described. The front side of the wafer will be oxidized to provide an insulating substrate which will serve as the upper surface 33 of die 12 and on which a contact material may be deposited.

A standard tri-metal system may be used to deposit conductor material on upper surface 33 of die 12. The metal used may be a sandwich of three metals such as titanium-tungsten, palladium, and gold. Gold forms the actual electrical contact surface.

Using standard etching practices, the metal may then be etched to leave the necessary conductive runners. Specifically, runners 32, 34, and 36 will be needed on first contact faces 38, 40, and 42, respectively, of accelerometer beams 20, 22, and 24, respectively. Runners 32, 34, and 36 may extend from near the free end of their respective beams to wire bond pads 44, 46, and 48 located on the periphery of surface 33. The width of metal runners 32, 34, and 36 on first contact faces 38, 40, and 42, respectively, may be chosen to give adequate tolerance for alignment, yet not significantly alter the mechanical behavior of the accelerometer beams. In addition, contact pad 50, runner 52, and wire bond pad 54 will be needed to provide, electrical input to device 10. In the assembled accelerometer switch, feed-through conductors such as 56 are associated with the four wire bond pads 44, 46, 48, and 54. The feed-through conductors are electrically connected to their associated wire bond pad by a wire as shown in the figures.

After completion of the front side wafer processing, the wafer will be lapped down from the backside to the desired thickness of the die 1 and then polished to optical quality. Silicon nitride may then be deposited on the backside and patterned to open the areas in which the silicon will be etched. A silicon anisotropic etchant such as a solution of potassium hydroxide, alcohol, and water may be used to thin the silicon chip in the appropriate region where beams are to be formed. For example, the etching will determine the thickness of beam 20, and the end mass 31 may be formed by masking during the etching so that silicon is left at the end of the beam. Anisotropic etching of (100) oriented silicon results in the sloping side surfaces of the beam 20, the end mass 31, and void 18 as shown in the figures.

Finally the beams will be defined by laser milling through the remaining silicon web. A computer-controlled, YAG, thin film laser trimming system with optical positioning may be used.

Contact plate 14 may be formed from glass such as glass wafers using similar microelectronic techniques. Plate 14 is of smaller size than die 12 so that when plate 14 is placed over die 12, it covers void 18 but does not cover wire bond pads 44, 46, 48, and 54. The inner side of contact plate 14 has a peripheral mating surface 58 for mating with surface 33 of die 12 and a second contact face 60. Contact face 60 is generally recessed, and according to an important feature of the present invention, the recessed area is in a two-level configuration. The first level 62 is a raised portion of the contact face 60 having a contact 63. Second level 64 is the contact face surrounding the raised portion 62.

The starting material for contact plate 14 will be glass wafers polished to optical flatness. The glass may be batch-processed in a way similar to the silicon. The glass will first be masked and etched to form an etch to the level of the raised portion 62 of the contact face 60. The glass will then be patterned and etched to the depth of the surrounding second level 64.

Contact plate 14 will then be metallized using the same metal system as used on accelerometer die 12. The metal will then be etched to form the opposing fixed contact wire runner 66 and contact pad 68.

Accelerometer backplate 16 is fabricated from a glass wafer. The backplate increases the overall strength of the accelerometer backplate 16 includes peripheral mating surface 72 and recessed area 74. In accordance with an important feature of the present invention, the same metal system used with the die and contact plate may be used to leave a small pedestal or bump 76 directly below the end mass. Pedestal 76 provides for mechanical biasing of the accelerometer beam toward closure, making it less responsive to vibration and noise and more resistant to mechanical shock.

Accelerometer die 12, contact plate 14, and backplate 16 may be aligned and bonded together using the known technique of anodic bonding. This technique produces a hermetic and irreversible seal between silicon and glass. The result is a bond without an interface material such as epoxy or solder so that the gap 65 between first contact 39 and second contact 63 is defined solely by the depth of the glass etch forming raised portion 62, the thickness of the contact metal on raised portion 62, and the thickness of the metal on first contact face 38.

The operation of the accelerometer switch may be described with reference to typical beam 20. In operation, an acceleration in the direction of arrow 1 in FIG. 2 will cause a deflection from the relaxed or no acceleration condition. As the acceleration increases, accelerometer beam 20 will move to an increasingly strained condition with free end 30 moving toward contact face 60. If the acceleration is sufficient, first contact 39 will strike second contact 63.

Frequently the acceleration is not normal to the surface 33 of die 12. For example, the acceleration may contain a component transverse to beam 20, as indicated by arrow 2 in FIG. 2. As further illustrated in FIG. 2, a transverse acceleration will cause twisting of beam 20 and some rotation of end mass 31 about an axis parallel to the longitudinal axis of beam 20. It may be appreciated that the two-level configuration of contact face 60 will allow end mass 31 to tilt or have some rotation but still allow closure of first contact 39 and second contact 63. Specifically, second level 64 provides a relief to allow for the tilting or rotation of end mass 31.

The invention disclosed herein may be embodied in other specific forms without departing from the spirit of the invention. Thus, the scope of the invention is to be indicated by the appended claims.

What is claimed is:

1. An accelerometer switch, comprising:
    a contact plate;
    a backplate;
    an accelerometer die formed from a single piece of semiconductor material, said accelerometer die sandwiched between said contact plate and said backplate, said accelerometer die having a plurality of cantilever beams, each said cantilever beam having a fixed end and a free end, each said free end carrying an integral end mass, each said cantilever beam further having a first contact face;
    a first electrical contact located on said first face;
    a second contact face located on said contact plate and spaced from said first contact face, said second face having a raised portion located to be complementary to said first electrical contact; and
    a second electrical contact located on said raised portion such that a threshold acceleration normal to said first contact face will cause bending of said cantilever beam thereby carrying said first electrical contact into engagement with said second electrical contact; said raised portion allowing said first contact to engage said second contact when said first contact face is tilted due to an offnormal acceleration.

2. The switch of claim 1 including electrical connecting means between said first contact and a switch terminal associated with said first contact.

3. The switch of claim 2 including electrical connecting means between said second contact and a common switch terminal.

4. The switch of claim 3, further comprising:
    a pedestal located on said backplate directly below each said end mass for biasing each said first contact more closely toward engagement with each said second contact.

* * * * *

UNITED STATES PATENT AND TRADEMARK OFFICE
CERTIFICATE OF CORRECTION

PATENT NO. : 4,855,544

DATED : August 8, 1989

INVENTOR(S) : Max Glenn

It is certified that error appears in the above-identified patent and that said Letters Patent is hereby corrected as shown below:

Column 1, after the title insert --The Government has rights in this invention pursuant to Contract No. DAAL02-85-C-0145, awarded by the Department of the Army.--

Signed and Sealed this

Thirty-first Day of July, 1990

Attest:

HARRY F. MANBECK, JR.

Attesting Officer

Commissioner of Patents and Trademarks